United States Patent [19]
Flambard et al.

[11] 3,837,218
[45] Sept. 24, 1974

[54] PROCESS FOR NON-DESTRUCTIVE MEASUREMENT OF THE EXTENT TO WHICH A SURFACE LAYER OF A MATERIAL HAS BEEN AFFECTED BY A SUPERFICIAL TREATMENT

[75] Inventors: Christian Flambard, Gagny; Alain Lambert, Creil, both of France

[73] Assignee: Centre Technique des Industries Mecaniques, Senlis, France

[22] Filed: Sept. 21, 1972

[21] Appl. No.: 290,873

[30] Foreign Application Priority Data
Sept. 24, 1971 France .............................. 71.34370

[52] U.S. Cl. .............................................. 73/67.8 R
[51] Int. Cl. .......................................... G01n 29/00
[58] Field of Search ......... 73/67.5, 67.7, 67.8, 67.9, 73/71.54, 67.5 R

[56] References Cited
UNITED STATES PATENTS

| | | | |
|---|---|---|---|
| 2,984,756 | 5/1961 | Bradfield | 73/67.5 R X |
| 3,364,732 | 1/1968 | Sasaki | 73/67.8 S |
| 3,433,059 | 3/1969 | Cavalier | 73/71.5 U |
| 3,554,013 | 1/1971 | Berg | 73/67.7 |
| 3,610,028 | 10/1971 | Sasaki | 73/67.8 |

FOREIGN PATENTS OR APPLICATIONS

| | | | |
|---|---|---|---|
| 1,065,907 | 5/1954 | France | 73/67.8 R |
| 780,752 | 8/1957 | Great Britain | 73/67.8 |

*Primary Examiner*—Richard C. Queisser
*Assistant Examiner*—Stephen A. Kreitman

[57] ABSTRACT

The invention relates to a process and device for non-destructive measurement of the extent to which a surface layer of a material has been affected by a superficial treatment. The device includes a single transducer emitter-receiver of ultrasonic waves movable over a cylindrical surface of a coupling block, the latter having a curved reflective surface such that a beam of ultrasonic waves, when reflected by the surface of the material being treated, is then reflected by the curved surface back to the surface of the material and from there reflected back to the transducer.

12 Claims, 6 Drawing Figures

PROCESS FOR NON-DESTRUCTIVE MEASUREMENT OF THE EXTENT TO WHICH A SURFACE LAYER OF A MATERIAL HAS BEEN AFFECTED BY A SUPERFICIAL TREATMENT

The invention relates to a process for non-destructive measurement of the extent to which a surface layer of a material has been affected by a superficial treatment, particularly for measurement of the depth to which a material has been affected by a thermal and/or thermochemical and/or galvanic treatment to which components are subjected and to a device for carrying out said process.

BACKGROUND OF THE INVENTION

Such processes as have been previously proposed include directing a beam of ultrasonic waves towards the surface of a sample of the material to be studied, and measuring the energy of the reflected beam at various angles of incidence of the original beam. Devices for carrying out such processes have included a probe for emitting ultrasonic waves and a receiving probe, the probes being symmetrically movable.

An object of the invention is to improve such processes with a view to obtaining more precise measurements in certain cases.

SUMMARY OF THE INVENTION

According to the present invention, there is provided a process for non-destructive measurement of the extent to which a surface layer of a material has been affected by a superficial treatment, particularly for measurement of the depth to which a material has been affected by a thermal and/or thermochemical and/or galvanic treatment, said process including directing a beam of ultrasonic waves towards the surface of a sample of the material to be studied, and measuring the energy of the reflected beam at various angles of incidence of the original beam, the reflected beam before the energy thereof is measured being caused to reflect at least once against another reflective surface and to return towards the surface of the sample.

According to the present invention, there is also provided a device for carrying out the process as described in the preceding paragraph, including a transducer emitter-receiver for ultrasonic waves, a coupling block which is locatable between the transducer and the sample, means for supporting the transducer on the block, and means for measuring the orientation of said transducer on said block, the latter having at least one surface adapted to contact the sample, a cylindrical surface on which the transducer is supported, and a curved surface forming the other reflective surface.

Thus, the surface wave phenomena utilized may be repeated at least once, and the sensitivity of measurement of the energy of the beam after the final reflection from the surface of the sample may be correspondingly increased.

Preferably, the other relfective surface is arranged in such a way that the return beam is sent back towards the surface of the sample substantially along the same path as the path of the beam first reflected from the surface of the sample, whatever the incidence of the first reflected beam.

DESCRIPTION OF THE DRAWINGS

Embodiments of the present invention will now be described by way of example with reference to the accompanying drawings in which.

DESCRIPTION OF PREFERRED EMBODIMENTS

Figure 1:
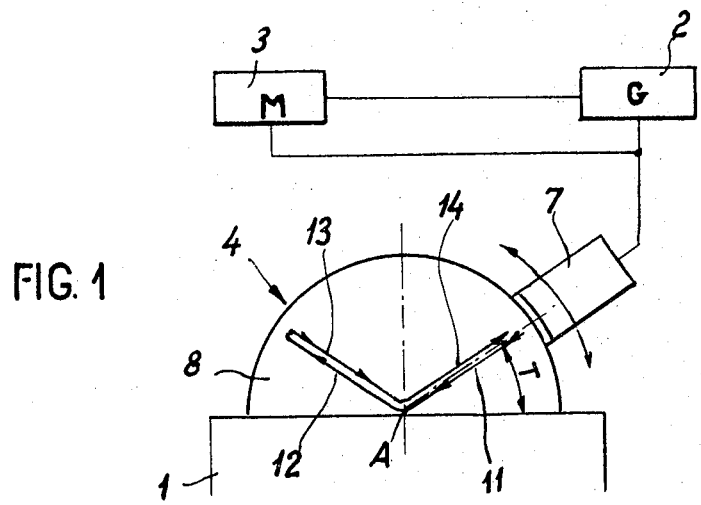
FIG. 1 is a diagram of a first embodiment.

The device shown diagrammatically in FIG. 1 is intended particularly for non-destructive measurement of the depth to which a material, e.g. a steel component 1, has been affected by a superficial thermal and/or thermochemical and/or galvanic treatment. The device comprises a generator 2, a measurement assembly 3 and a probe head 4.

The generator 2 is capable of delivering ultrasonic electrical signals, for example in the form of short-duration pulses or sequence waves of regulable length. Various frequencies may be used.

The measurement assembly 3 comprises mainly an oscilloscope, possibly accompanied by a recording device for analyzing the signals.

The probe head 4 comprises a transducer emitter-receiver probe 7 and a coupling block 8 locatable between said probe 7 and the component to be studied.

In the example shown, the coupling block 8 is made of polymethyl methacrylate, and it is semicylindrical in shape, its plane surface being intended to be applied to a plane surface of the component 1 to be studied. The emitter-receiver probe 7 is supported on the cylindrical surface of the coupling block 8 and may be moved in a circumferential direction, so as to vary an incident beam 11 which it emits and which strikes the component 1 on the surface thereof which is to be analyzed.

The generator 2 delivers electrical signals to the probe 7 and the beam 11 emitted by this probe strikes the component 1 on the surface which is to be analyzed at a point A, where it is reflected, as shown by beam 12, and consequently strikes radially (or substantially radially), the cylindrical interface between the block 8 and the atmosphere so as to form a reflected beam 13 which follows in a reverse direction the same path as the beam 12. Reflection again takes place at point A on said surface of component 1 and, following in the reverse direction the same path as the initial beam 11, a second reflected beam 14 penetrates the probe 7, which now acts as a receiving probe.

In order to prevent interference in the probe 7 between the emitted and the received beams, the beam 11 is emitted at intervals separated by silent phases during which the reflected beam 14 is received.

The incident beam 11 is thus subjected, on said surface of the component 1, to two successive reflections before returning in the form of beam 14 into probe 7.

The material of the coupling block 8 is such that the variation of the limiting angle $Tr$ relative to a variation of the speed $vr$ of propagation of the surface waves is as large as possible. The relationship between the limiting angle $Tr$ and the speed $vr$ is:

$$\sin Tr = v/vr,$$

in which $v$ is the speed of propagation of the longitudinal waves in the region of the coupling "probe-component."

For a given variation of $vr$ a variation of $Tr$ is thus obtained, the $Tr$ variation increasing with increase of the speed $v$ in the coupling region. This is why materials are used for which the speed of generation of longitudinal ultrasonic waves is as large as possible.

It should be noted, however, that this speed $v$ must be lower than the speed of propagation of the surface waves in the material being checked. Otherwise, i.e. if $v$ were greater than $vr$, it would no longer be possible to produce the surface waves.

It may be stated by way of example that, in a controlled environment constituted by steel, $vr$ is of the order of 3,000 m/s. V must be selected in the vicinity of this value, and less than this value.

Good results are obtained by using as a material for the coupling block polymethyl methacrylate, for which $v$ is of the order of 2,700 m/s.

In order to obtain optimum transmission of the vibrations in the device, probe 7 is applied to the cylindrical surface of the coupling block 8, preferably with an interposed film of oil or grease.

The acoustic coupling between the coupling block 8 and the component 1 to be checked may also be obtained through a film of oil or grease. It may again be obtained through a chamber filled with a liquid, such as water or oil, slight pressurization of which results in deformation of a diaphragm which conforms exactly to the shape of the surface to be checked.

Figure 4:
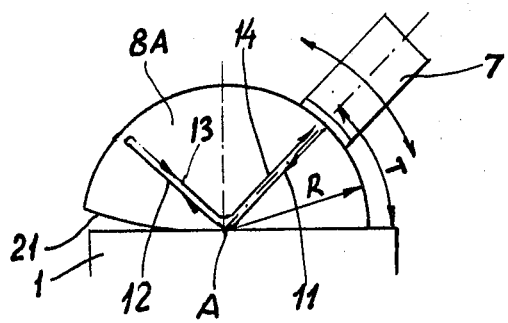
FIGS. 4 to 6 show variations of the shape of the probe head.

FIG. 4 shows a coupling block 8A of a slightly different configuration, in which one half of its plane surface is slightly raised as shown at 21, which facilitates perfect emission of the ultrasonic waves.

Figure 5:
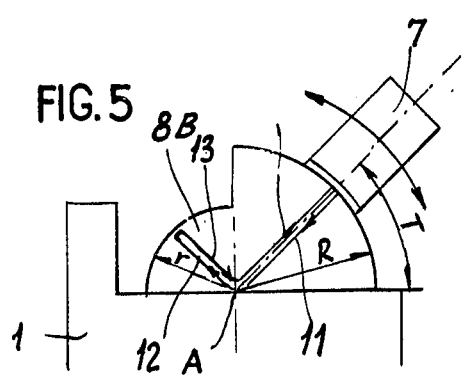

FIG. 5 shows a coupling block 8B of another configuration, one half of said block 8B having a radius of curvature $r$ smaller than the radius of curvature $R$ of the other half, which carries the probe 7. Thus a block of lesser volume is obtained.

Figure 6:
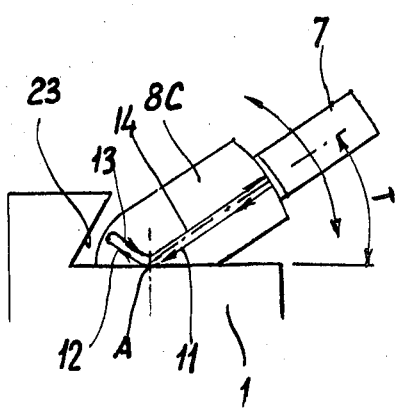

FIG. 6 shows an example of a coupling block 8C, of greatly reduced volume, for example for affording access to corners, such as those formed in a dovetail slide 23. The angle of incidence T may then vary only between narrower limits, whereas, in the FIGS. 1, 4 and 5, it may vary between 0° and 90°.

In order to monitor the surface of components of a special shape, e.g. cylindrical or spherical, it is sufficient to shape the bearing surface of the coupling block against the component.

Figure 2:
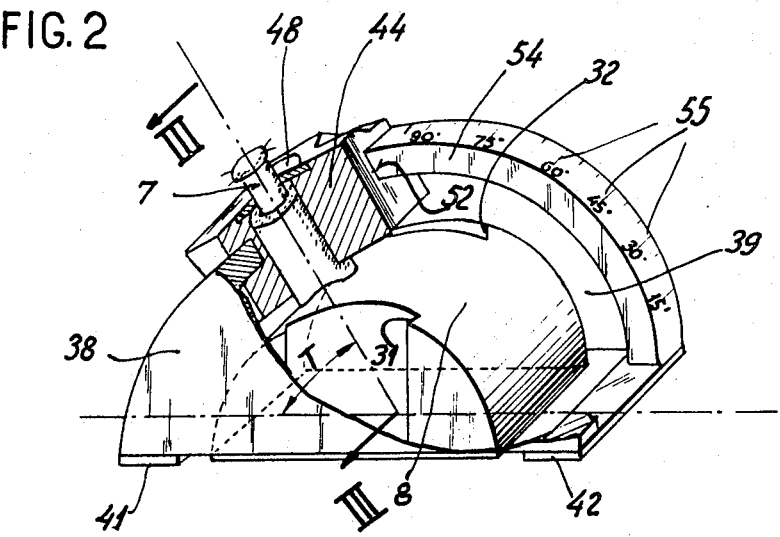
FIG. 2 shows in perspective, with portions cut out, the main part of the apparatus in FIG. 1, i.e. the probe head.
Figure 3:
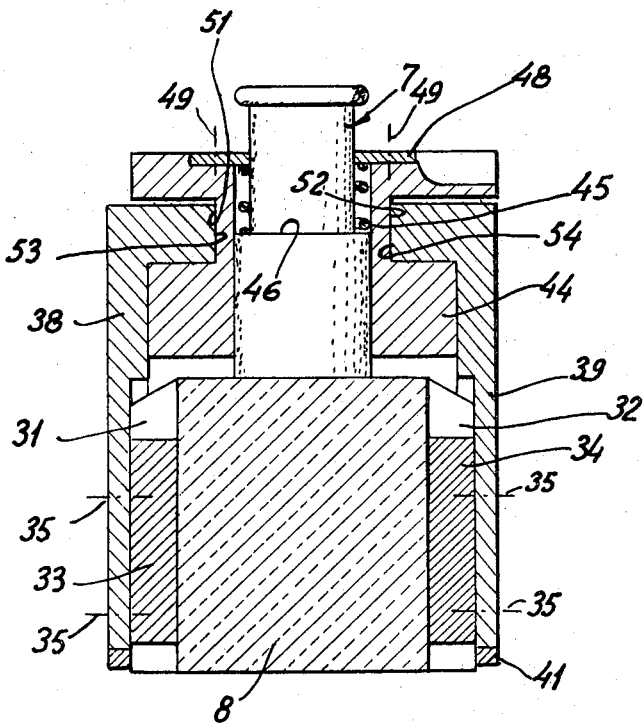
FIG. 3 shows, on a larger scale, a section along line III—III of FIG. 2.

FIGS. 2 and 3 show in slightly more detail the construction of the apparatus of FIG. 1. In these figures is shown only the coupling block 8 and the emitter-receiver probe 7. The coupling block 8 has on its two end surfaces two radial grooves 31, 32, with a dovetail cross-section, to enable the block 8 to slide over two correspondingly dovetail-shaped splines 33, 34 fixed, for example, by screws, indicated simply by their axes 35, against the inner faces of two semicircular cheeks 38, 39 coaxial with block 8 and connected by two cross-pieces 41, 42.

The emitter-receiver probe 7 is mounted in a radial guide 44, and is applied against the cylindrical surface of the coupling block 8 by a spring 45, one end of which is supported against a shoulder 46 of the probe 7, and the other end of which abuts an inner face of a plate 48 fixed, for example, by screws, indicated by their axes 49, to the radial guide 44. The latter has two arcuate passages 51, 52 in which are received two complementary arcuate ribs 53, 54 formed respectively on the inner faces of the two cheeks 38, 39.

Also shown is a calibration 55 on the outer cylindrical surface of rib 54 of cheek 39, to enable the position of radial guide 44 on the cylindrical surface of coupling block 8 to be noted, thus to allow the value of the angle of incidence T of the incident beam to be read off.

In order to use the apparatus, the probe 7 is moved until an angular position is reached when the energy of the reflected beam 14 is minimal, thus giving the value of the critical angle T of the incident beam 11, which causes the surface waves on the component to be checked.

The apparatus as previously described with reference to the drawings allows rapid industrial measurements to be taken, is easy to handle, is portable and may be applied to components of any dimensions. It can be adapted to the shapes of the said components and its design and construction are very simple.

It will be understood that changes may be made in the details of construction and operation without departing from the spirit of the invention, especially as defined in the following claims.

We claim:

1. A process for non-destructive measurement of the extent to which a surface layer of a material has been affected by a superficial treatment, particularly for measurement of the depth to which a material has been affected by a thermal and/or thermo-chemical and/or galvanic treatment, said process including the steps of directing a beam of ultrasonic waves at various angles of incidence through a coupling block to the surface of the material to be studied, causing the ultrasonic wave beam to be once reflected from said surface back into the coupling block and thereafter reflected from a surface of said coupling block back to the material surface and measuring the energy of the beam after a second reflection from the surface of said material to the source of ultrasonic energy.

2. A process as claimed in claim 1, wherein the reflective surface of the coupling block is arranged in such a way that the beam reflected therefrom is sent back towards the surface of the sample along a path substantially coinciding with the path of the beam first reflected from the surface of the sample.

3. A process as claimed in claim 2, wherein the reflective surface of the coupling block has a curved profile.

4. A process as claimed in claim 1, wherein the incident beam is emitted by, and the reflected beam, after said second reflection, is received by, a transducer emitter-receiver.

5. A process as claimed in claim 4, wherein emission is effected at intervals separated by silences during which reception is effected.

6. A process as claimed in claim 1, wherein the beam of ultrasonic waves is emitted in the form of pulses.

7. A process as claimed in claim 1, wherein the beam of ultrasonic waves is emitted in the form of sequence waves of regulable length.

8. A device for the non-destructive measurement of the extent to which a surface layer of a material has been affected by a superficial treatment, particularly for measurement of the depth to which a material has been affected by a thermal and/or thermo-chemical and/or galvanic treatment, said device including a transducer emitter-receiver for ultrasonic waves; a coupling block between the transducer and the material; means for suporting the transducer on the block; said block having at least one surface adapted to contact the material, a cylindrical surface on which the transducer is adjustably positioned and a reflective surface; means for measuring the orientation of said transducer on said block to correctly position said transducer for surface layer measurement; and means for measuring reflected beam energy; whereby the ultrasonic wave beam is directed through the coupling block to the surface of the material to be studied, reflected from said surface back into the coupling block and thereafter reflected from said reflective surface of said coupling block back to the material surface and reflected therefrom back to the emitter-receiver.

9. A device as claimed in claim 8, wherein the coupling block is made of a plastic material.

10. A device as claimed in claim 8, wherein the coupling block is made of polymethyl methacrylate.

11. A device as claimed in claim 8, for examining samples whose surface to be examined is flat, the coupling block having a semicylindrical shape, the plane surface of which is adapted to rest on the flat surface of the sample, part of the cylindrical surface of which constitutes the surface on which the transducer is positioned and the other part of the cylindrical surface of which constitutes said reflective surface, said means for supporting the transducer being so mounted as to be pivotal on an axis coinciding with the axis of the said cylindrical surface.

12. A device as claimed in claim 8 wherein the curved surface of the coupling block is a portion of a cylindrical surface coaxial with the cylindrical surface on which the transducer is supported, but of smaller radius.

* * * * *